Sept. 24, 1968  R. E. SWAIN  3,402,497
OWNER-IDENTIFYING INDICIA FOR WIRE PORTABLE
CARRIERS AND METHOD OF APPLYING
Filed March 7, 1966

INVENTOR
ROBERT E. SWAIN
BY Harry C. Delante
ATTORNEYS

United States Patent Office 3,402,497
Patented Sept. 24, 1968

3,402,497
OWNER-IDENTIFYING INDICIA FOR WIRE PORTABLE CARRIERS AND METHOD OF APPLYING
Robert E. Swain, Des Plaines, Ill., assignor to National Tea Co., Chicago, Ill., a corporation of Illinois
Filed Mar. 7, 1966, Ser. No. 532,405
7 Claims. (Cl. 40—308)

ABSTRACT OF THE DISCLOSURE

The invention involves a portable wire strand or mesh receptacle body such as but not limited to a shopping cart which is highly mobile and subject to theft, misuse, and unauthorized removal from the owner's premises. The teachings thereof embody the concept of articulating owner identifying indicia of wire similar in type to the strands of the wire body, and applying these in juxtaposition therewith for contact with multiple body wires to enable permanent attachment by spot welding or similar expedients thereto with sufficient connections that require substantial mutilation of the receptacle body for removal, thereby rendering it undesirable to remove the identification thereon and thus discourage theft and unauthorized use.

---

This invention relates to wire articulated shopping containers and more particularly to origin identifying expedients interwoven therewith to constitute a part thereof against removal without destroying the containers, although the teachings thereof may be employed with equal advantage for other purposes and in different situations.

It contemplates more especially the provision of identifying indicia as an interwoven wire articulated part of the shopping containers to constitute a non-destructible part thereof to avoid the theft, misuse, and unauthorized removal from the premises of the owners.

Shopping containers and principally shopping carts which are usually articulated from heavy wire into a rigid container or shopping cart are expensive and their theft, misuse and removal accounts for a substantial annual loss which is estimated at more than one-half million dollars in the United States. This loss has evaded all efforts to eliminate or at least minimize the disappearance of these shopping carts from food stores and similar establishments, and the purpose of the teachings of the present invention is to provide a more effective and practically indestructible identifying indicia which constitutes a woven part thereof and is as integrally associated therewith as necessary so that removal is impossible without destruction to the container or cart itself.

One object of the present invention is to provide a wire articulated container or car with ownership identifying indicia articulated much like the container itself and integrally welded thereto at points of juxtapositioning with the wires of the container or cart walls so that removal would require its destruction.

Another object is to provide wire-woven containers and carts with origin indicia woven much like the original container walls for juxtapositioning therewith and welded joinder at points of contact.

Still another object is to provide wire woven containers with similarly articulated origin indicia for welded connection to the walls thereof at points of juxtapositioning contact.

A further object is to provide wire articulated indicia juxtaposed with wire articulated container walls for welded juncture therewith so that removal requires destruction of both.

A still further object is to provide wire articulated ownership indicia for juxtapositioning with similarly constructed container walls welded thereto at points of contact therebetween.

Other objects and advantages will appear from the following description of an illustrated embodiment of the present invention.

Figure 1:
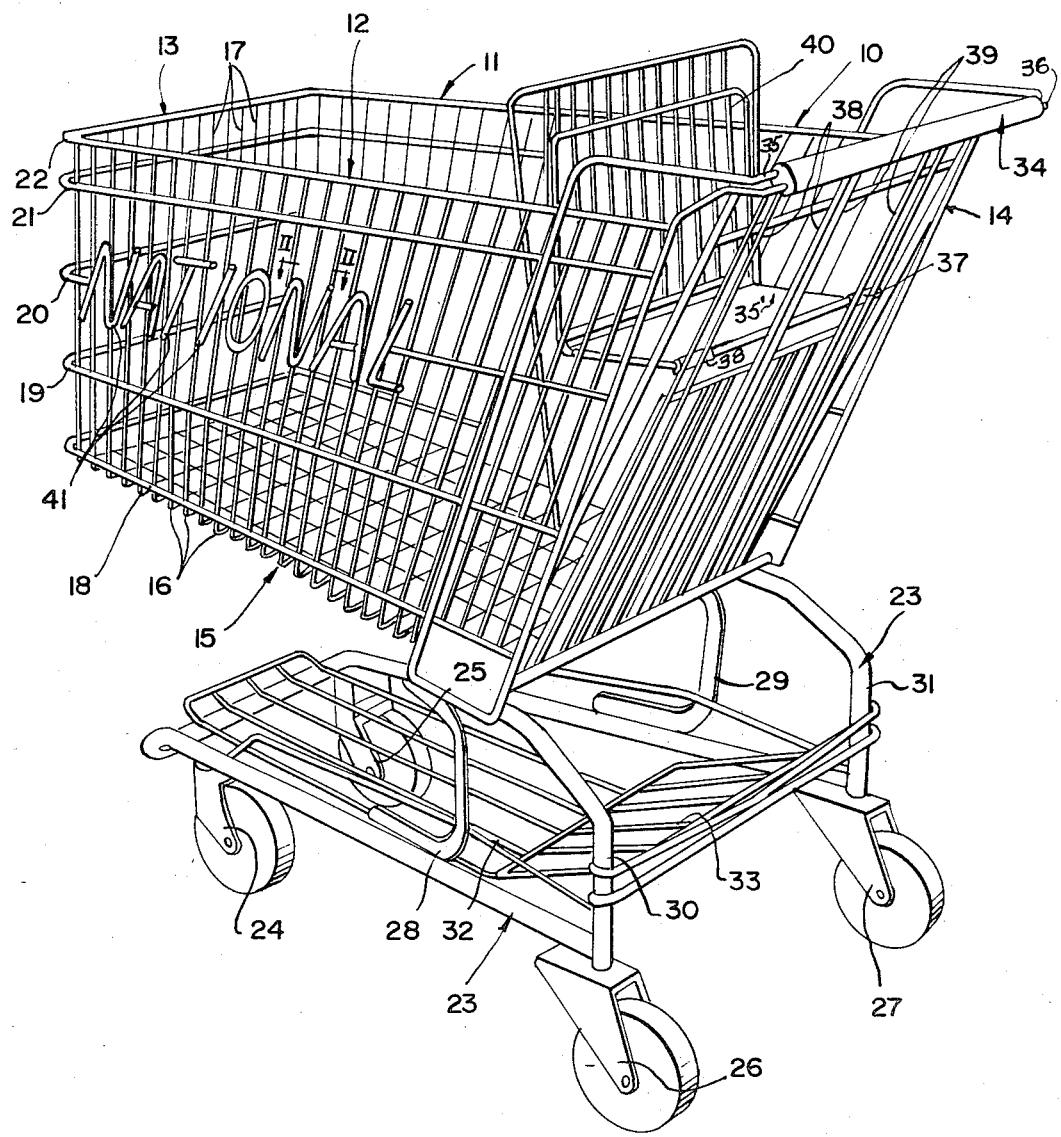
FIGURE 1 is a perspective view of a shopping cart having identifying indicia articulated therewith in accordance with the teachings of the present invention.

The structure selected for illustration is not intended to serve as a limitation upon the scope or teachings of the invention, but is merely illustrative thereof. There may be considerable variations and adaptations of all or part of the teachings depending upon the dictates of commercial practice. The present invention and its teachings are exemplified by a merchandise confining open top receptacle, container or cart body 10 articulated or fabricated preferably in any suitable known manner from durable wire components to present sides 11–12–13–14, in this instance four substantially rectangular upright side walls 11–12–13–14 and a bottom 15. The side walls 11–12, in this instance comprises uniformly spaced single one-piece wires 16 bent or otherwise shaped to extend transversely around the sides 11–12 and bottom 15 while the front and rear ends 13–14 comprise uniformly spaced single one-piece wires 17. The wires 17 extend longitudinally around the ends 13–14 and bottom 15 to cross in adjacent juxtaposition and contact with the bottom wires 16 to be permanently connected by welded joinder at the points of juxtapositioning contact as at 16' to define any desired type of portable basket or cart container 10.

The basket 10 is, in this instance, shaped to define a substantially rectangular body member reinforced by comparatively heavy frame defining transverse wires 18–19–20–21–22, in this instance five, which serve as substantially U-shaped transverse ribs disposed in juxtaposition with the transverse and longitudinal wires 15–16 for welded connection therebetween at the points of crossed contact and juxtapositioning therebetween. It should be noted that any number of such ribs 18–19–20–21–22 may be utilized deepnding upon the average load to be carried and the purposes to which the basket body 10 is intended. In the preferred embodiment illustrated herein, the rear end wall 14 is inclined rearwardly and upwardly to present a large portable basket 10 comprising part of a shopping cart utilized in food stores and primarily in the larger food chain stores of the self-service type wherein shoppers select a large number of items from shelves and displays for convenient mobile transporting thereof.

This is accomplished by attaching the basket or contained 10 to a mobile sub-frame 23 consisting, in this instance, of tubular pipe articulated and shaped into a low frame to carry front swivel steering caster brackets 24–25 and rear fixed caster brackets 26–27 to rotatively support caster wheels in a straight line for forward and rearward displacement of the sub-frame 23 which supports the basket or container 10. The basket 10 is supported in vertical elevated spaced relation to the sub-frame 23, by a plurality of appropriately shaped tubular pipe standards comprising pairs 28–29 and 30–31. The tubular pairs of standards 28–29 and 30–31 support the wire receptacle body or basket 10 for attachment thereto proximate to the rearward end region 17 thereof to effect the support to a bottom wire carrier 32 fixed to the sub-frame 23.

As shown, the bottom carrier 32 has an upwardly inclined rearward extension 33 to discourage packages from slipping off rearwardly as the cart assembly is wheeled or started forwardly. A handle 34 extends for substantially the width of the basket 10 for mounting or molded attachment to transverse rods or heavy wires 35–36 welded or otherwise connected to the wire basket or container 10. A suitable infant's seat 35' pivots as at 37–38 to selectively assume an upright position against the rear end 14 which has spaced leg openings 38'–39' therein for the convenient sitting position of an infant on the seat 35' when the latter is displaced or pivoted to its horizontal position for support by the hinges 37–38 along one edge and the pivotal wire partition member 40 that serves to support the back of an infant resting on the seat 35' in a sitting position for movement along with the items in the basket 10.

Figure 2:
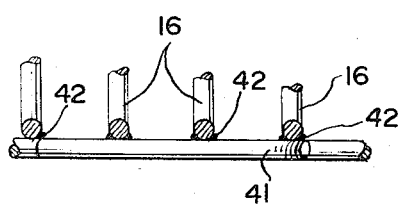
FIGURE 2 is a fragmentary sectional view taken substantially along line II—II of FIGURE 1.

With the tiltable wire partition member 40 against the rear end inclined back wall 14, the seat 35' rests against the leg openings 38'–39' to serve as a closure therefor when the seat 35' is collapsed to rest thereagainst without carrying an infant. Now, then, the concept of providing ownership identifying indicia such as the wire articulated letters 41, in this instance spelling out the name "National," as an example to discourage the theft or misuse thereof, involves the use of slanted letters to overlap the more or less vertical wires 16 of the basket 10. This will enable the application of each letter comprising the identifying name 41, so that contact is made in two or more positions by each letter of the name 41, along the basket wires 16 for joinder thereto and permanent attachment through spot welding or any other suitable joining expedients. The spot welding is effected at the points of contact 42 (FIGURE 2) to the basket 10 to secure the name 41 thereto and preclude the detachment or removal thereof without substantially damaging the basket 12 on both sides thereof.

Each letter of the identifying indicia 41 is bent, shaped or otherwise articulated from heavy wire to spell out any name desired by the buyer, and these letters are spot-welded or otherwise permanently attached to the confronting wires comprising the sides 11–12 of the basket 10. Letters which are as simple as "I" will be spot-welded at least at two positions to the basket wires 16 while other more involved letters like "A" would be spot-welded as at 42 along adjacent wires 16 in at least four positions so that mutilation of the basket 10 would be required to render the basket 10 unuseable or at least sufficiently disfigured that neighbors and the authorities will know that the basket 10 or its entire cart assembly belongs to others rather than the then user thereof away from a store or other establishment furnishing such for the convenience of their customers.

This expedient for identifying the basket 10 or its cart assembly, renders the removal of each letter and more so the entire name 41 almost impossible or so disastrously impairs or disfigures the basket 10 as to render such almost useless for the surreptitious use intended therefor away from the establishment from which it was stolen. Thus, there is such an impelling negation for adverse possession under the circumstances that the stealth thereof will be discouraged or stopped and the carts remain with the stores which righteously own them. This will save large food and other retail firms substantial amounts of money which exceed a half-million every year according to surveys.

While I have illustrated and described a preferred embodiment of the invention, it must be understood that my invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A portable carrier comprising a merchandise confining receptacle body of wire strands spaced from each other and articulated into side walls and a bottom to form an integral container, cross-strands disposed in juxtaposition relative to said first named wire strands for welded interconnection at the areas of juxtaposition into a rigid integral container or body member, identifying ownership indicia articulated from wire substantially of the type comprising the wire strands of said receptacle body and applied to the exterior thereof in juxtaposition to said body member strands, and permanent interconnecting spot welds at the points of juxtaposition between said wire identifying ownership indicia and said body member strands, whereby any attempted removal of said ownership indicia would require sufficient destruction occasioned to said rigid body member to discourage the surreptitious removal or misuse of the portable container.

2. A portable carrier defined in claim 1 wherein the identifying ownership indicia are articulated into individual letters of the alphabet to selectively spell any desired word indicia for specific portable carriers.

3. A portable carrier defined in claim 2 wherein the ownership indicia letters are articulated for positioning across and against relatively disposed wire strands of the rigid body member so that each articulated letter provides multiple points of engagement therewith for spot-welded interconnection at a number of points of juxtapositioning to render it impossible to remove without substantially damaging the rigid body member.

4. A portable carrier defined in claim 1 wherein the articulated ownership indicia is so disposed against multiple wire strands of the portable body member maximum juxtapositioning contact therebetween.

5. A portable member defined in claim 2 wherein the wire rigid body member has at least one comparatively heavy wire cross-strand against which some of the ownership indicia letters are juxtaposed for permanent spot-welded connection thereto.

6. A portable carrier defined in claim 5 wherein the articulated letters connected to the relatively heavy cross-strand are also spot welded to the other wires of the rigid body member juxtaposed for contact therewith.

7. A portable carrier defined in claim 1 wherein each individual articulated ownership letter of the simplest character is juxtaposed for contact against at least two body wires for spot-welded connection to more than one strand.

References Cited

UNITED STATES PATENTS

| | | | |
|---|---|---|---|
| 360,457 | 4/1887 | Moche | 40—125 |
| 1,377,345 | 5/1921 | Hartmeyer | 40—2.2 |
| 1,505,290 | 8/1924 | Scanlan | 40—125 |

FOREIGN PATENTS 19,625  2/1912  Great Britain.

OTHER REFERENCES

United Shopping Carriers Catalog, United Steel and Wire Co., Battle Creek, Mich., November 1957, description of United 187 on p. 3.

EUGENE R. CAPOZIO, *Primary Examiner.*

W. W. NIELSEN, *Assistant Examiner.*